(12) United States Patent
Fraser

(10) Patent No.: US 8,464,463 B1
(45) Date of Patent: Jun. 18, 2013

(54) PLANT SCREENING APPARATUS

(76) Inventor: Tamila J. Fraser, Brookings, SD (US)

( * ) Notice: Subject to any disclaimer, the term of this patent is extended or adjusted under 35 U.S.C. 154(b) by 250 days.

(21) Appl. No.: 12/939,774

(22) Filed: Nov. 4, 2010

(51) Int. Cl.
*A01G 13/00* (2006.01)
*A01G 13/02* (2006.01)
*A47G 7/08* (2006.01)

(52) U.S. Cl.
USPC .................................................. 47/31

(58) Field of Classification Search
USPC .................................... 47/31, 31.1, 20.1
See application file for complete search history.

(56) References Cited

U.S. PATENT DOCUMENTS

| | | | | |
|---|---|---|---|---|
| 1,114,933 A * | 10/1914 | Stricklen | ................ | 135/130 |
| 1,544,322 A * | 6/1925 | Kellermann | ................ | 47/31 |
| 1,848,345 A * | 3/1932 | Gregg | ................ | 47/20.1 |
| 1,926,053 A * | 9/1933 | Morgan | ................ | 47/31 |
| 2,004,396 A * | 6/1935 | Sage | ................ | 493/287 |
| 2,141,484 A * | 12/1938 | Piglia | ................ | 47/30 |
| 2,953,870 A * | 9/1960 | Nelson | ................ | 47/23.2 |
| 3,360,884 A | 1/1968 | Budd | | |
| 3,384,992 A * | 5/1968 | Heffron | ................ | 47/29.2 |
| 3,706,160 A * | 12/1972 | Deibert | ................ | 47/23.2 |
| 3,896,586 A | 7/1975 | Caldwell | | |
| 4,035,950 A | 7/1977 | Anselm | | |
| 5,813,170 A | 9/1998 | Friesner et al. | | |
| 6,067,747 A | 5/2000 | Reed | | |
| 6,230,436 B1 * | 5/2001 | Givens | ................ | 47/29.5 |
| 2006/0112621 A1 | 6/2006 | White | | |
| 2009/0272031 A1 | 11/2009 | Lais et al. | | |

* cited by examiner

*Primary Examiner* — Monica Williams

(57) ABSTRACT

A plant screening apparatus is provided for preventing pest damage to a plant while permitting access to light, water and nutrients. The plant screening apparatus includes a base member for positioning on a support surface. The base member has a central opening for positioning the base member around a plant. A screen is coupled to the base member and a support assembly is coupled to the base member. The screen is supported by the support assembly such that the screen is positioned to enclose an interior space designed for containing the plant.

11 Claims, 6 Drawing Sheets

PLANT SCREENING APPARATUS

BACKGROUND OF THE DISCLOSURE

Field of the Disclosure

The disclosure relates to plant protection devices and more particularly pertains to a new plant protection device for preventing pest damage to a plant while permitting access to light, water and nutrients.

SUMMARY OF THE DISCLOSURE

An embodiment of the disclosure meets the needs presented above by generally comprising a base member for positioning on a support surface. The base member has a central opening for positioning the base member around a plant. A screen is coupled to the base member and a support assembly is coupled to the base member. The screen is supported by the support assembly such that the screen is positioned to enclose an interior space designed for containing the plant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
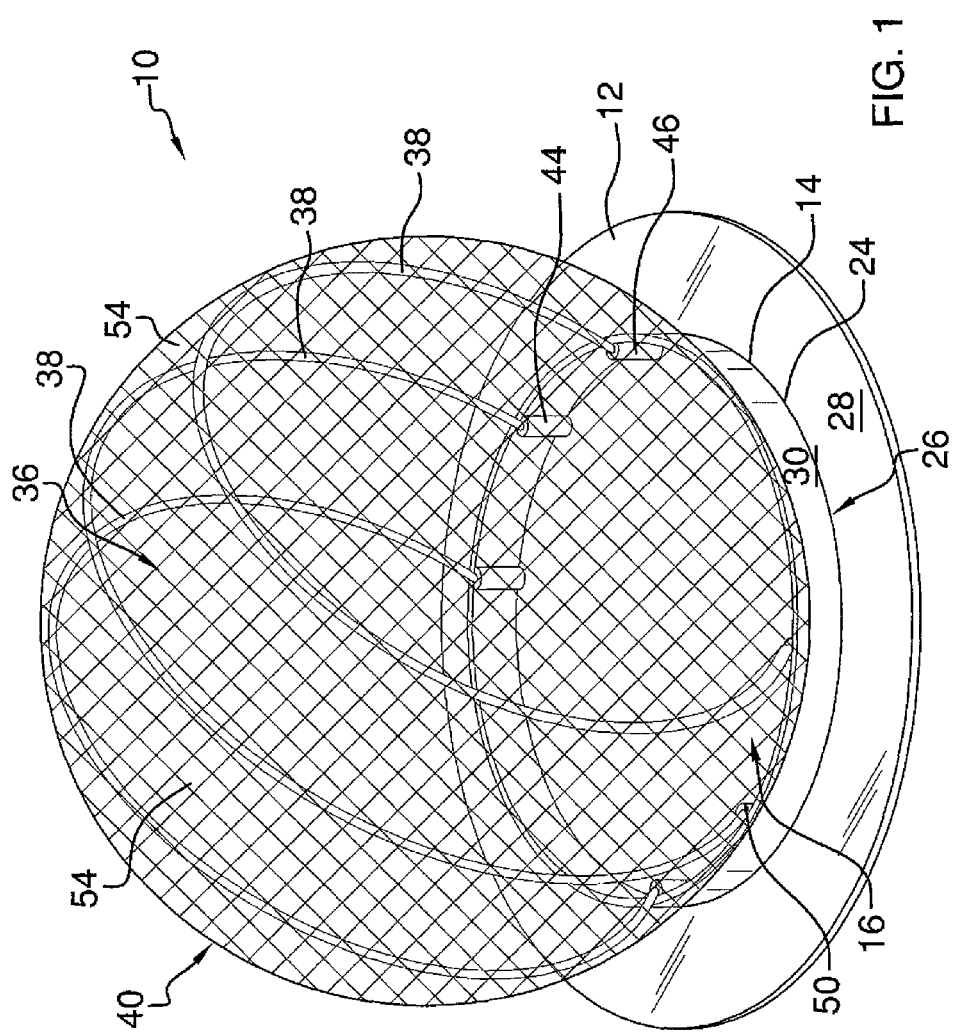
FIG. 1 is a top front side perspective view of a plant screening apparatus according to an embodiment of the disclosure.
Figure 2:
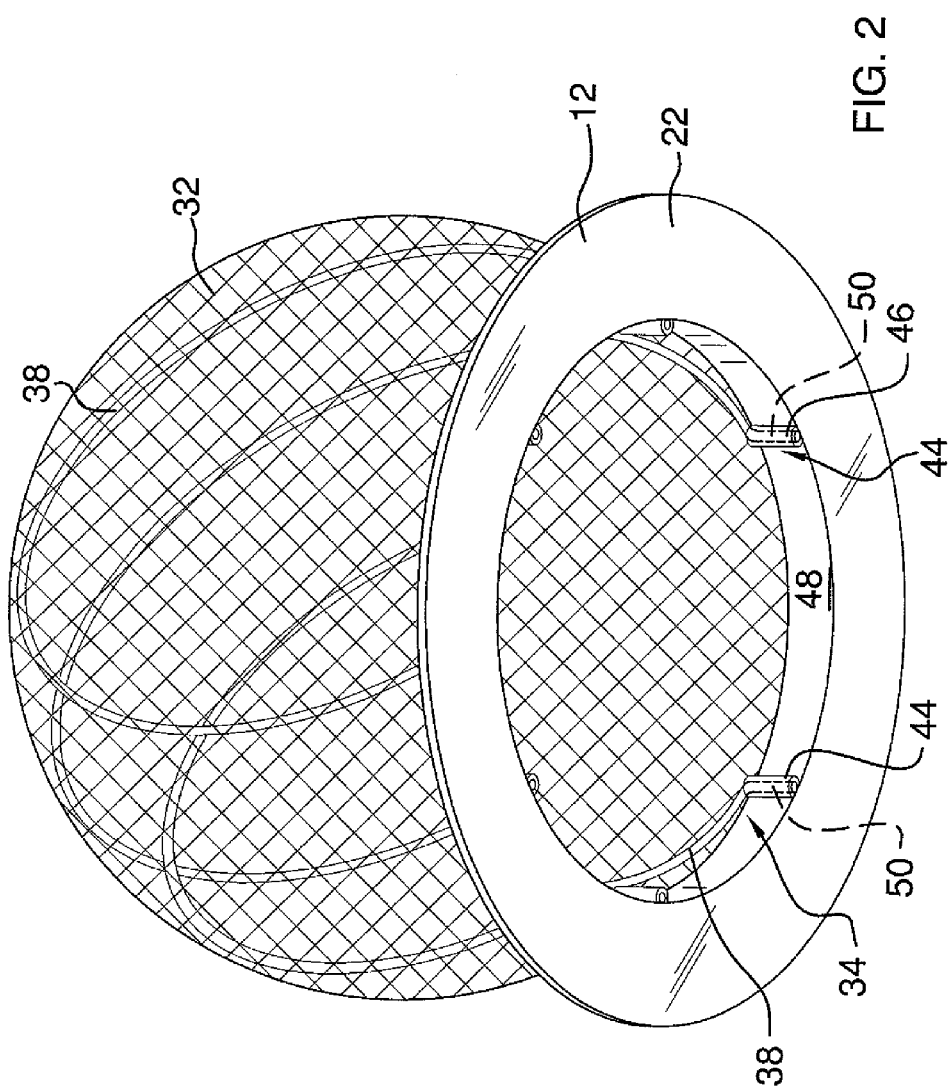
FIG. 2 is a bottom back side perspective view of an embodiment of the disclosure.
Figure 3:
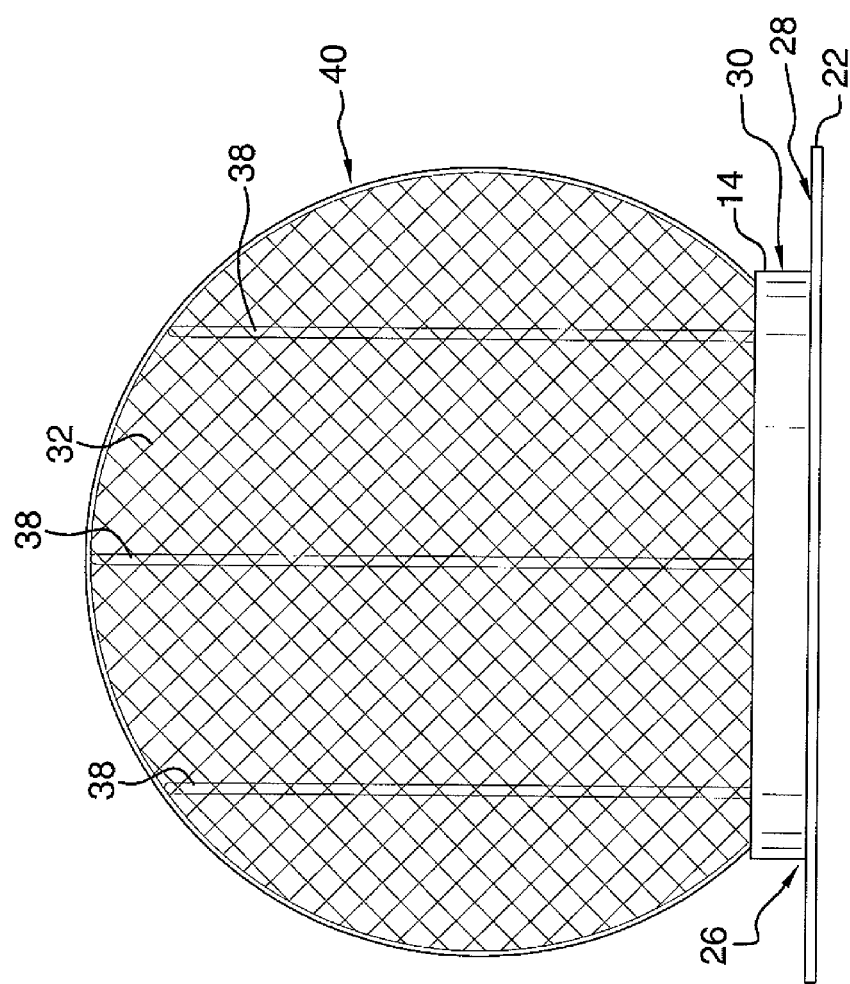
FIG. 3 is a front view of an embodiment of the disclosure.
Figure 4:
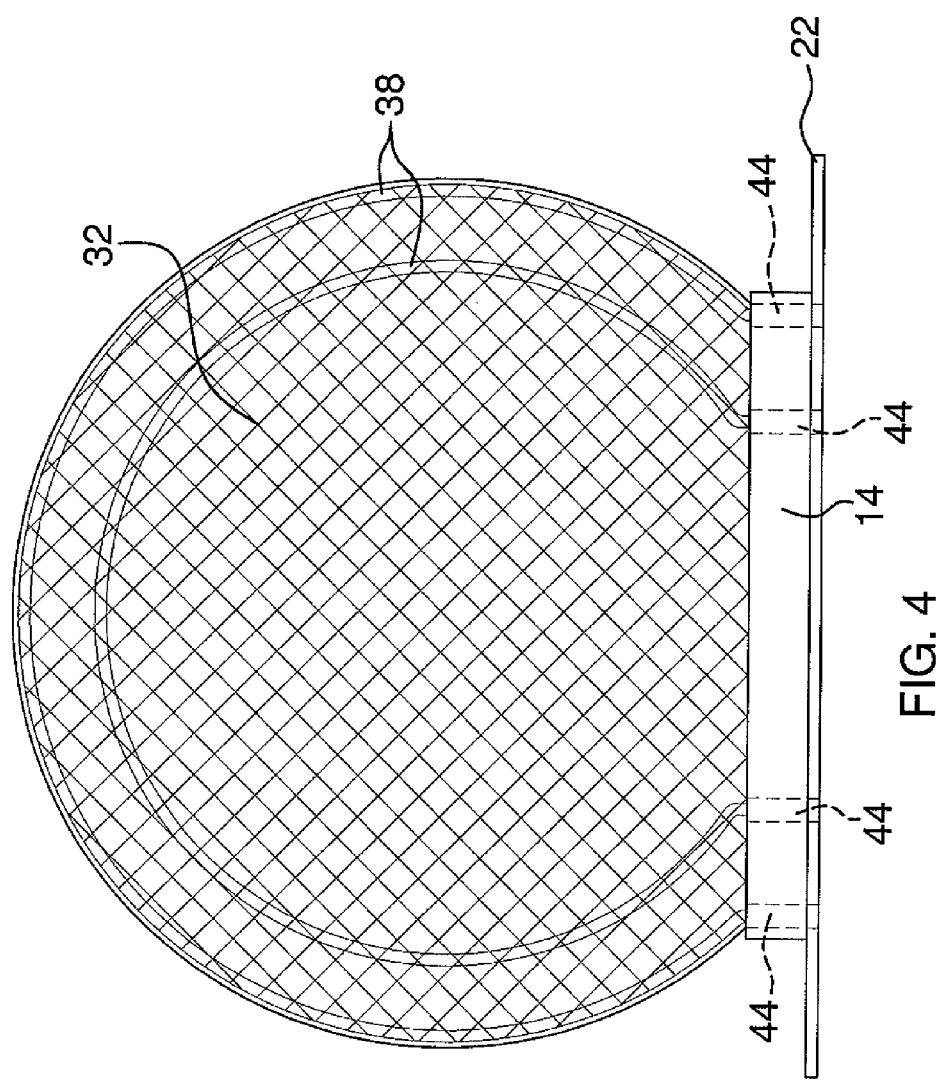
FIG. 4 is a side view of an embodiment of the disclosure.
Figure 5:
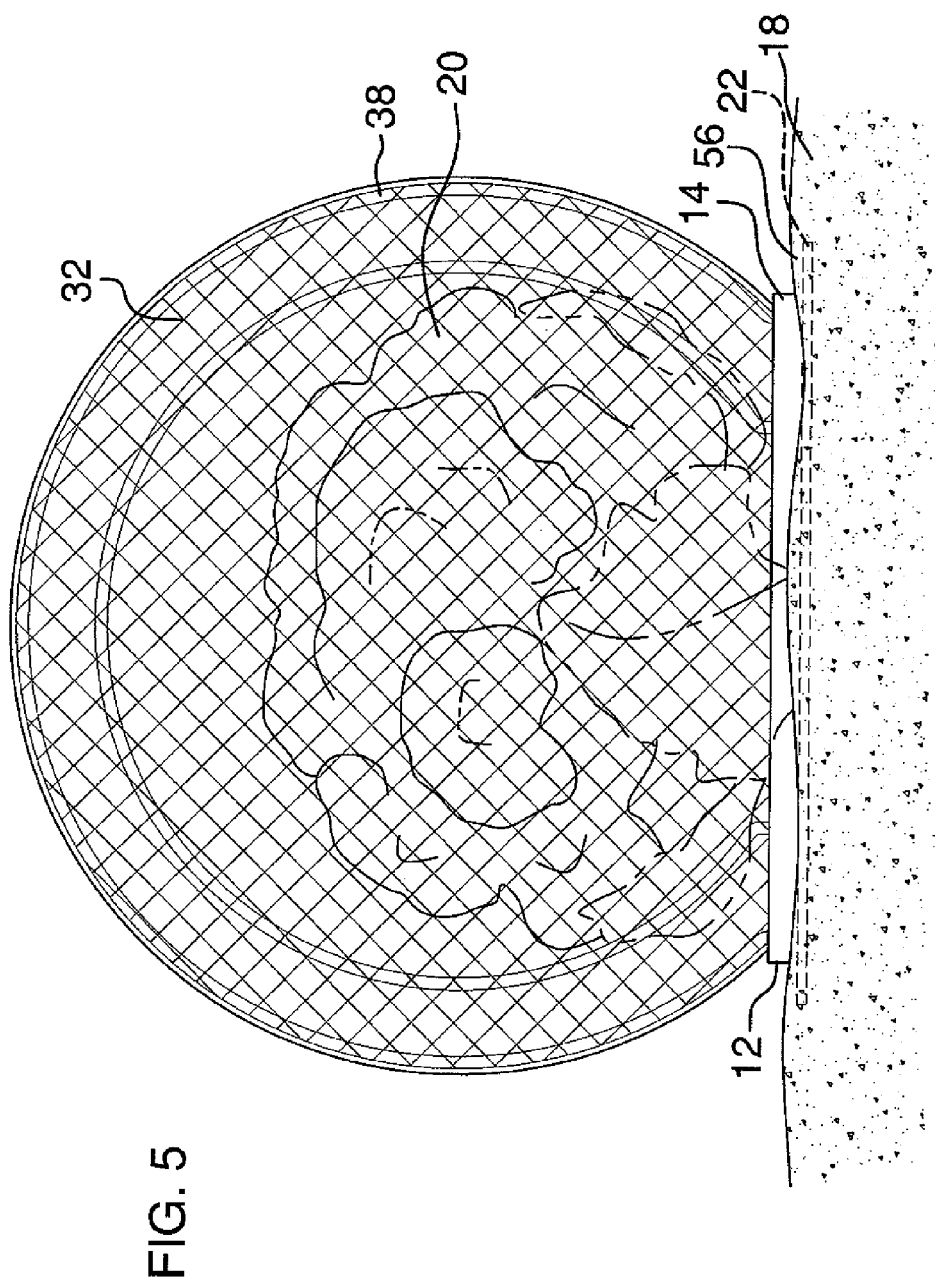
FIG. 5 is a side view of an embodiment of the disclosure in use.

With reference now to the drawings, and in particular to FIGS. 1 through 6 thereof, a new plant protection device embodying the principles and concepts of an embodiment of the disclosure and generally designated by the reference numeral 10 will be described.

As best illustrated in FIGS. 1 through 6, the plant screening apparatus 10 generally comprises a base member 12 having an annular collar 14 forming a central opening 16 such that the base member 12 is designed for positioning on a support surface 18 around a plant 20. A planar flange 22 extends continuously around a circumference of the collar 14. The flange 22 extends outwardly from a bottom edge 24 of the collar 14 to form an approximate right angle 26 between an upper surface 28 of the flange 22 and an outer surface 30 of the collar 14. A flexible mesh screen 32 is coupled to the collar 14 of the base member 12 around the central opening 16.

Figure 6:
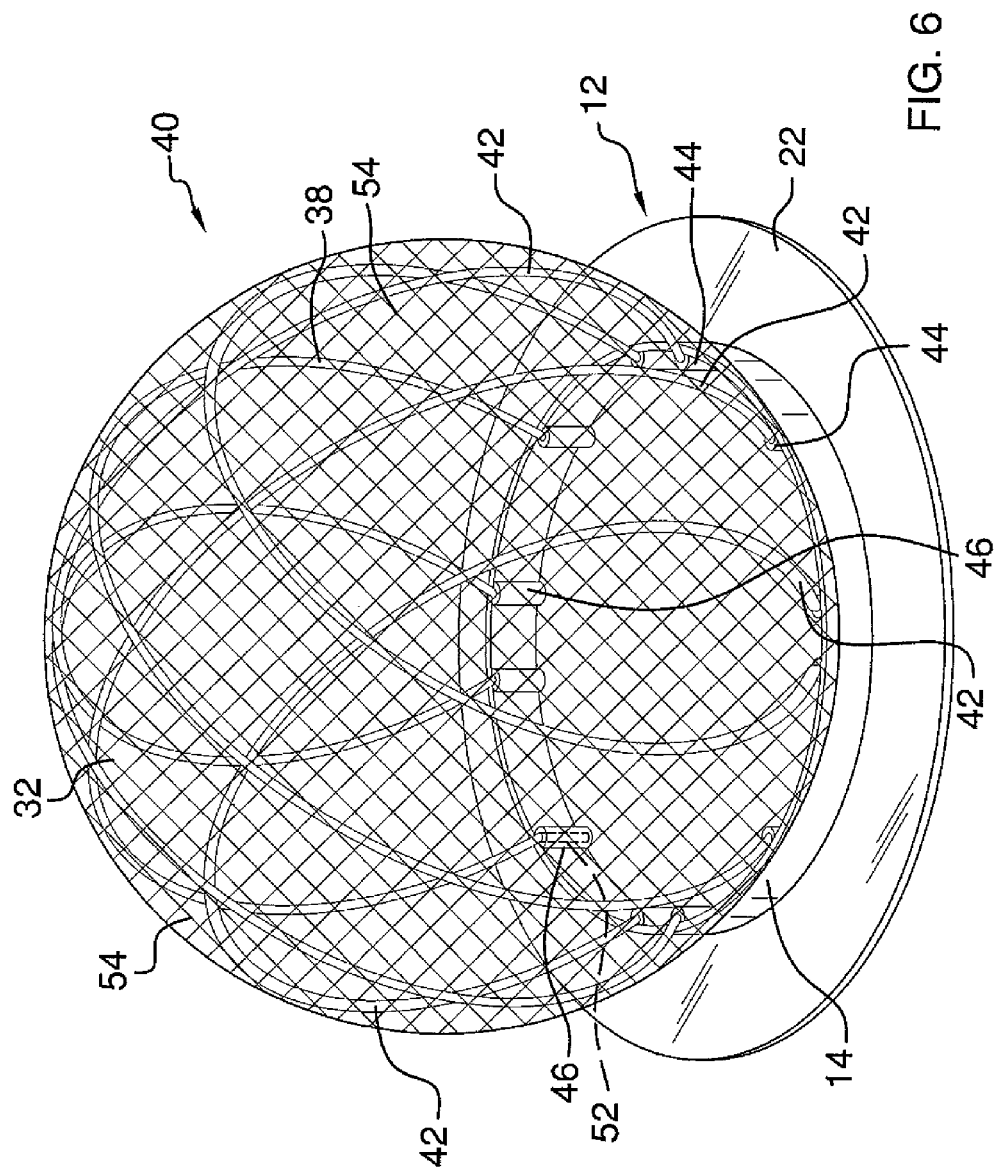
FIG. 6 is a top front side perspective view of an embodiment of the disclosure.

A support assembly 34 is coupled to the base member 12 to correctly position the screen 32 to enclose an interior space 36 designed for containing and protecting the plant 20. The support assembly 34 has an array of spaced supports 38. The number supports 38 may vary however three supports 38 will adequately support the screen 32. The array of spaced supports 38 is shaped such that the screen 32 is supported in a bulbous shape 40 extending from the central opening 16. As such, each individual support of the array 38 is arcuate. As shown in FIG. 6, the support assembly 34 may further have an array of three spaced bearing members 42 extending transversely across the central opening 16 relative to the array of supports 38. The array of spaced bearing members 42 is also shaped such that the screen 32 is supported in the bulbous shape 40 extending from the central opening 16.

A plurality of receivers 44 is coupled to the base member 12 around the central opening 16. Each receiver 44 is an elongate tube 46 or sleeve positioned on an interior surface 48 of the collar 14 of the base member 12. The array of supports 38 has end portions 50 inserted into the receivers 44 such that the supports 38 are coupled to the base member 12. Similarly, the array of bearing members 42 has end portions 52 inserted into the receivers 44 such that the array of bearing members 42 is coupled to the base member 12.

In use, the base member 12 is positioned on the support surface 18. Soil 56 is taken from the support surface 18 and placed on the flange 22 to anchor the base member 12 to the support surface 18. The supports 38, which may include the bearing members 42, form the support assembly 34 that holds the screen 32 in the bulbous shape 40 around the plant 20. Thus, many pests are obstructed and prevented access to plants such as cabbage or lettuce as they grow. However, the openings 54 in the screen 32 permit passage of light, water, and nutrients. All parts may be constructed of plastomeric material for durability.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A plant screen assembly comprising:
   a base member having a central opening such that said base member is adapted for positioning on a support surface around a plant;
   a mesh screen coupled to said base member;
   a support assembly coupled to said base member and said screen such that said screen is positioned to enclose an interior space adapted for containing the plant; and
   said screen having an upper portion positioned distal to said base member, a lower portion positioned proximate said screen and a middle portion positioned between said upper and lower portions, said lower portion flaring outwardly and arcuately away from said base member, said upper portion tapering inwardly and arcuately to an apex of said screen, wherein a horizontal plane may be positioned said upper and lower portions to defined a hemisphere shaped section of said screen including said apex.

2. The assembly of claim 1, further comprising:
said base member having an annular collar forming said central opening, said collar having a cylindrical shape; and
said base member having a flange extending from said collar.

3. The assembly of claim 2, wherein said flange extends continuously around a circumference of said collar.

4. The assembly of claim 2, wherein said flange is planar.

5. The assembly of claim 4, wherein said flange extends outwardly from a bottom edge of said collar to form a right angle between an upper surface of said flange and an outer surface of said collar.

6. The assembly of claim 1, further including said support assembly having an array of spaced supports.

7. The assembly of claim 6, wherein said array of spaced supports is shaped such that said screen is supported in a bulbous shape extending from said central opening.

8. The assembly of claim 6, further including said support assembly having an array of spaced bearing members extending transversely across said central opening relative to said array of supports.

9. The assembly of claim 6, further comprising:
a plurality of receivers coupled to said base member around said central opening; and
said array of supports having end portions inserted into said receivers such that said array of supports is coupled to said base member.

10. The assembly of claim 9, wherein each receiver is an elongate tube positioned on an interior surface of a collar of said base member.

11. A plant screen assembly comprising:
a base member having an annular collar forming a central opening such that said base member is adapted for positioning on a support surface around a plant;
a planar flange extending continuously around a circumference of said collar, said flange extending outwardly from a bottom edge of said collar to form a right angle between an upper surface of said flange and an outer surface of said collar;
a flexible mesh screen coupled to said base member, said screen having an upper portion positioned distal to said base member, a lower portion positioned proximate said screen and a middle portion positioned between said upper and lower portions, said lower portion flaring outwardly and arcuately away from said base member, said upper portion tapering inwardly and arcuately to an apex of said screen, wherein a horizontal plane may be positioned said upper and lower portions to defined a hemisphere shaped section of said screen including said apex;
a support assembly coupled to said base member such that said screen is positioned to enclose an interior space adapted for containing the plant;
said support assembly having an array of spaced supports, said array of spaced supports being shaped such that said screen is supported in a bulbous shape extending from said central opening;
said support assembly having an array of spaced bearing members extending transversely across said central opening relative to said array of supports, said array of spaced bearing members being shaped such that said screen is supported in said bulbous shape extending from said central opening;
a plurality of receivers coupled to said base member around said central opening, each receiver being an elongate tube positioned on an interior surface of said collar of said base member;
said array of supports having end portions inserted into said receivers such that said array of supports is coupled to said base member; and
said array of bearing members having end portions inserted into said receivers such that said array of bearing members is coupled to said base member.

\* \* \* \* \*